United States Patent
Fey et al.

(10) Patent No.: US 7,061,738 B2
(45) Date of Patent: Jun. 13, 2006

(54) PROTECTIVE CIRCUIT

(75) Inventors: Wilhelm Fey, Dirmstein (DE); Ernst Krause, Oftersheim (DE)

(73) Assignee: Pepperl & Fuchs GmbH, Mannheim-Schoenau (DE)

( * ) Notice: Subject to any disclaimer, the term of this patent is extended or adjusted under 35 U.S.C. 154(b) by 478 days.

(21) Appl. No.: 10/258,604

(22) PCT Filed: Sep. 19, 2001

(86) PCT No.: PCT/EP01/10842

§ 371 (c)(1),
(2), (4) Date: Dec. 18, 2002

(87) PCT Pub. No.: WO02/27888

PCT Pub. Date: Apr. 4, 2002

(65) Prior Publication Data

US 2003/0151869 A1    Aug. 14, 2003

(30) Foreign Application Priority Data

Sep. 22, 2000    (DE) ................................ 100 47 114

(51) Int. Cl.
*H02H 3/20*    (2006.01)
(52) U.S. Cl. .................................... 361/91.6
(58) Field of Classification Search ................ 361/91.6
See application file for complete search history.

(56) References Cited

U.S. PATENT DOCUMENTS

| | | | |
|---|---|---|---|
| 3,657,603 A * | 4/1972 | Adams | 361/56 |
| 4,178,619 A * | 12/1979 | Seiler et al. | 361/91.6 |
| 4,658,154 A * | 4/1987 | Harnden et al. | 307/132 R |
| 5,179,488 A | 1/1993 | Rovner | |
| 5,638,946 A | 6/1997 | Zabracky | |
| 5,838,547 A * | 11/1998 | Gane et al. | 361/765 |
| 6,054,659 A * | 4/2000 | Lee et al. | 200/181 |
| 6,201,680 B1 * | 3/2001 | Tokatian | 361/119 |

FOREIGN PATENT DOCUMENTS

| | | |
|---|---|---|
| DE | 36 22 268 C1 | 2/1988 |
| DE | 38 04 250 C1 | 7/1989 |
| DE | 41 00 634 A1 | 7/1992 |
| DE | 296 13 790 U1 | 11/1996 |
| DE | 691 21 718 T2 | 4/1997 |
| DE | 198 50 397 A1 | 5/2000 |
| WO | WO 00/62394 | 10/2000 |

OTHER PUBLICATIONS

*Über- und Unterspannungsschutz*, Bosma, Philip E., Elektro Zeitschrift für Electronik & Computertechnik, Jul.-Aug. 1995.
Electronische Universalsicherung, Elektor Zeitschrift für Elecotronik & Computertechnik, Mar. 1997.

* cited by examiner

*Primary Examiner*—Ronald Leja
(74) *Attorney, Agent, or Firm*—Jacobson Holman PLLC (57) ABSTRACT

A protective circuit for limiting the voltage for a device to be protected, particularly a load with an upstream-connected voltage and current limiting device. The device to be protected is provided in an output circuit of the protective circuit and is separable by means of a switching element, a voltage detector being provided with an electronic switch on the one hand and a voltage sensor on the other. The control terminal of the electronic switch is in electrical operative connection with the voltage sensor. A microdevice with a control circuit is provided, the microdevice having the switching element and being designed with a high input resistance of the control circuit. The control circuit is galvanically separated from the output circuit and switchable by the control circuit. The output circuit in the opened state has a galvanic separation of its output terminals.

20 Claims, 5 Drawing Sheets

PROTECTIVE CIRCUIT

This is a nationalization of PCT/EP01/10842 filed Sep. 19, 2001 and published in German.

BACKGROUND OF THE INVENTION

1. Field of the Invention

The present invention relates to a protective circuit for limiting the voltage for a device to be protected, particularly a load with an upstream-connected voltage and current limiting device. Such a protective circuit has in each case one input terminal and one output terminal, a common line and a voltage detector connected between the input terminal and the common line. The device to be protected is located in an output circuit of the protective circuit and is separable by means of a controllable switching device provided in a serial arrangement between the input terminal and output terminal and in which the voltage detector is in operative connection with the controllable switching device.

2. Description of the Related Art

Protective circuits of this type are known from EP 359 912 A1, EP 310 280 B1 or German patent 36 22 268. These known protective circuits suffer from various disadvantages. Thus, e.g. following the response of the corresponding fuse mechanism in EP 359 912 A1 it is necessary to manually replace a fuse. The circuits of German patent 36 22 268 and EP 310 280 B1 suffer from the disadvantage of high shunt currents and in addition an undesired voltage drop occurs in the operating area. Another disadvantage is that in the case of a fault a high power loss can arise.

Although in the not previously published PCT application WO 00/62394 A1 a solution is obtained to the aforementioned problems in that a protective circuit is placed upstream of the fuse mechanism for the load and has a rapid response behaviour, so that in the case of an overvoltage or an excessive current a rapid switching off of the downstream circuits is possible. However, the switch in this case is constituted by a FET located in the longitudinal branch between an input terminal of the protective circuit and the downstream fuse mechanism.

When using an FET the wiring possibilities and the arrangement in the protective circuit are limited and relatively inflexible, so that improvements are needed.

DE 38 04 250 C1 describes a circuit arrangement for current limiting purposes, particularly for use in the case of digital terminal devices. For switching off a voltage in a longitudinal branch of the circuit arrangement is provided the source-drain path of a field effect transistor, whose passage is controlled by its gate as a function of both the turning on of a transistor and the charging of a capacitor.

DE 296 13 790 U1 relates to a micromechanically manufactured microswitch in which, as comparable with a reed contact, a switching movement can be brought about by a magnetic field acting on an elastic, bendable support.

DE 41 00 634 A1 discloses a test device for IC's, particularly in mounted printed circuit boards, in which for the connection of individual test points of a testpiece with different test channels a plurality of microrelays is provided.

SUMMARY OF THE INVENTION

Thus, the object of the present invention is to provide a protective circuit for limiting the voltage of a device to be protected, particularly a load with an upstream-connected voltage and current limiting device, which can be flexibly designed in accordance with the circuit requirements, which has negligible direct-axis voltage component drops and shunt currents and which can in particular form a suitable protective function for a Zener barrier connected upstream of a load.

According to the invention this object is achieved by a protective circuit having an input terminal and an output terminal, a common line and a voltage detector connected between the input terminal and the common line. The device to be protected is located in an output circuit of the protective circuit and is separable by means of a controllable switching device provided in a serial arrangement between the input terminal and output terminal. The voltage detector is in operative connection with the controllable switching device which is a micromechanical component having a control circuit with a high input resistance and an output circuit galvanically separated from the control circuit and switchable via the latter, the output circuit in the opened switching state having a galvanic separation of its output terminals.

A protective circuit according to the preamble is further developed according to the invention in that the switching device is a micromechanical component, which has a control circuit with a high input resistance and an output circuit galvanically separated from the control circuit and which is switchable by means of the control circuit, the output circuit in the opened switching state having a galvanic separation of its output terminals.

Therefore a fundamental idea of the invention is not to design the necessary switch as a bipolar transistor, FET or the like, but instead to choose a micromechanical component with a high input resistance and galvanic separation of the output circuit and control circuit and which on switching off or opening the switch has a galvanic separation of the output terminals.

Appropriately the micromechanical component is implemented in the form of a microrelay based on materials and methods such as are of a conventional nature in micromechanics and/or semiconductor production.

In particular, in a highly advantageous manner, a choice is made of an e.g. silicon-based microrelay, which can have a suitable layer structure, e.g. similar to that of semiconductor components and whose layers are structured in such a way that the switching mechanical element is operable by electrostatic or piezoelectric forces, i.e. by change of charge. With respect to contact making or opening the contacts, said silicon microrelay can operate in a similar manner to the function of a leaf spring, a flectional bar beam or the like. Such a relay is described in exemplified manner in U.S. Pat. No. 5,638,946.

The voltage sensor means can be constituted by a voltage sensor diode, particularly a Zener diode, a power sensor or a temperature sensor, e.g. a temperature-variable resistor, e.g. a thermistor. In a preferred circuit design with the electronic switch (Tl) is associated at least one operating resistor (Rc) and with the voltage sensor diode (Dz) at least one resistor (Rb) and the control terminal of the electronic switch (Tl) is in operative connection with the resistor (Rb) and the voltage sensor diode (Dz).

A serious disadvantage with regards to the flexibility of the circuit design is the galvanic separation with respect to the microrelay between its control circuit and the terminals of the load circuit, as well as the high input impedance of the control circuit. Due to its microstructure said microrelay can also be implemented in an integrated construction with the further electronics and a subassembly as a SMD or in the form of a chip is conceivable.

However, as a function of the intended use, the possibility exists of providing external components with respect to the microrelay or to implement the necessary components directly as a subassembly with the said microrelay.

The high vibration resistance of the microrelay, which reduces the probability of faults is also highly advantageous. On choosing a microrelay as the switch, great importance is attached to the fact that it is very flexible and can be adapted in accordance with needs, i.e. with an existing voltage or current sensor it can be positioned in the circuit with a high degree of freedom in accordance with the starting requirements for the downstream load.

Thus, the microrelay with its control terminals can be directly controlled by means of a collector-emitter or collector-base or drain-source or drain-gate path of a transistor, respectively. The integration of a microrelay in existing circuits can normally take place relatively easily when there is a correct evaluation of the microrelay characteristics. Compared with when a FET is used as the switch, the voltage at the output is switched off without additional wiring in order to obtain a hysteresis in a type of tilting function. By means of a protective circuit with a microrelay as the switch, it is possible in advantageous manner to implement circuits against an overvoltage and overload, also with self-holding.

The important advantage of using a corresponding microdevice or microrelay as the switch in a protective circuit is the significant simplification with regards to the components needed for controlling the microrelay. In appropriate cases this simplification can lead to the microrelay alone and without further upstream components taking over the response function and the disconnection function for the downstream load.

Thus, in simplified manner, the invention provides a detector device for overvoltage and overload, which as the core cell in the protective circuit operates the switch of the corresponding microrelay. This core cell can be equipped with extension cells for adjusting or setting parameters of the core cell. It is also possible to incorporate the inherent protection of the microrelay against overvoltages. Such a protective circuit structure permits a high flexibility with respect to the design with switching transistors of the npn type or pnp type or as a FET.

As a function of requirements the microrelay can be designed as a normally open contact or as a normally closed contact.

Particularly as a result of the very short response behaviour, the high input resistance and the high switching frequency the microrelay also permits the protection of a voltage-current limiting device, normally constructed as a Zener barrier and which is connected upstream of a load or primary element. In other words a corresponding protective circuit has a faster separation than e.g. a downstream-connected Zener barrier, so that it is also possible to protect subassemblies in the explosion-proof range.

BRIEF DESCRIPTION OF THE DRAWINGS

The invention is described hereinafter relative to schematic embodiments and the attached drawings, wherein show.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
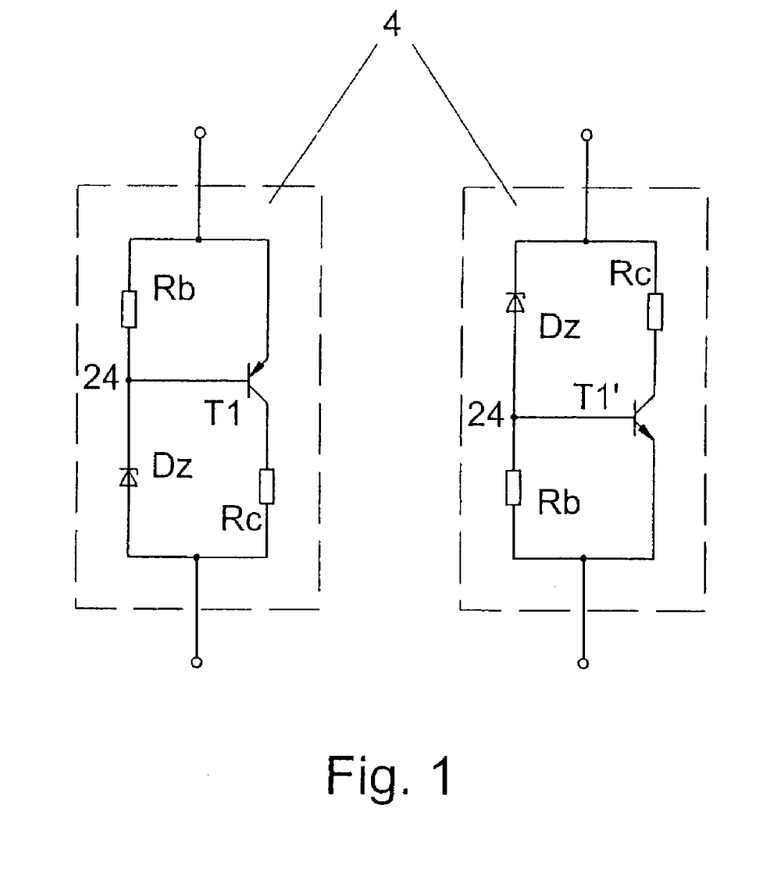
FIG. 1 Two variants of a core cell with pnp or npn transistor, respectively.

FIG. 1 diagrammatically shows two variants of a voltage detector 4. The voltage detector 4 which can also be called a core cell 4 essentially comprises a parallel circuit, in whose one branch is located a transistor Tl and a collector resistor Rc in series therewith. In the other branch is provided a Zener diode Dz and a base resistor Rb. The base of the transistor Tl is passed to the connecting point 24 between the Zener diode and the base resistor Rb. In the left-hand case shown the transistor Tl is a bipolar pnp transistor. In the right-hand variant shown a npn transistor Tl' is provided. It is also possible to use FET's in place of bipolar transistors.

Figure 2:
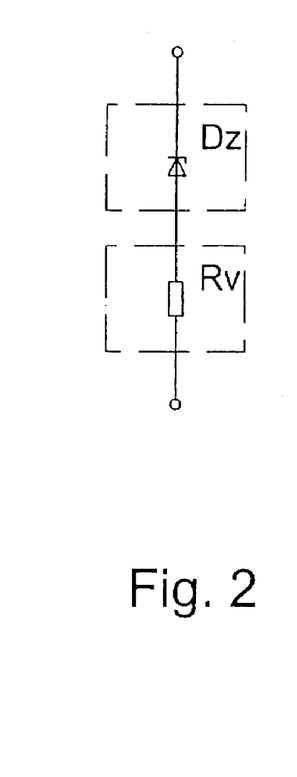
FIG. 2 An extension cell for extending the basic circuit with a core cell according to FIG. 1.

FIG. 2 shows an example of an extension cell for the core cell variants shown in FIG. 1. In this case the extension cell comprises a Zener diode Dz and a resistor Rv connected in series therewith.

Figure 3:
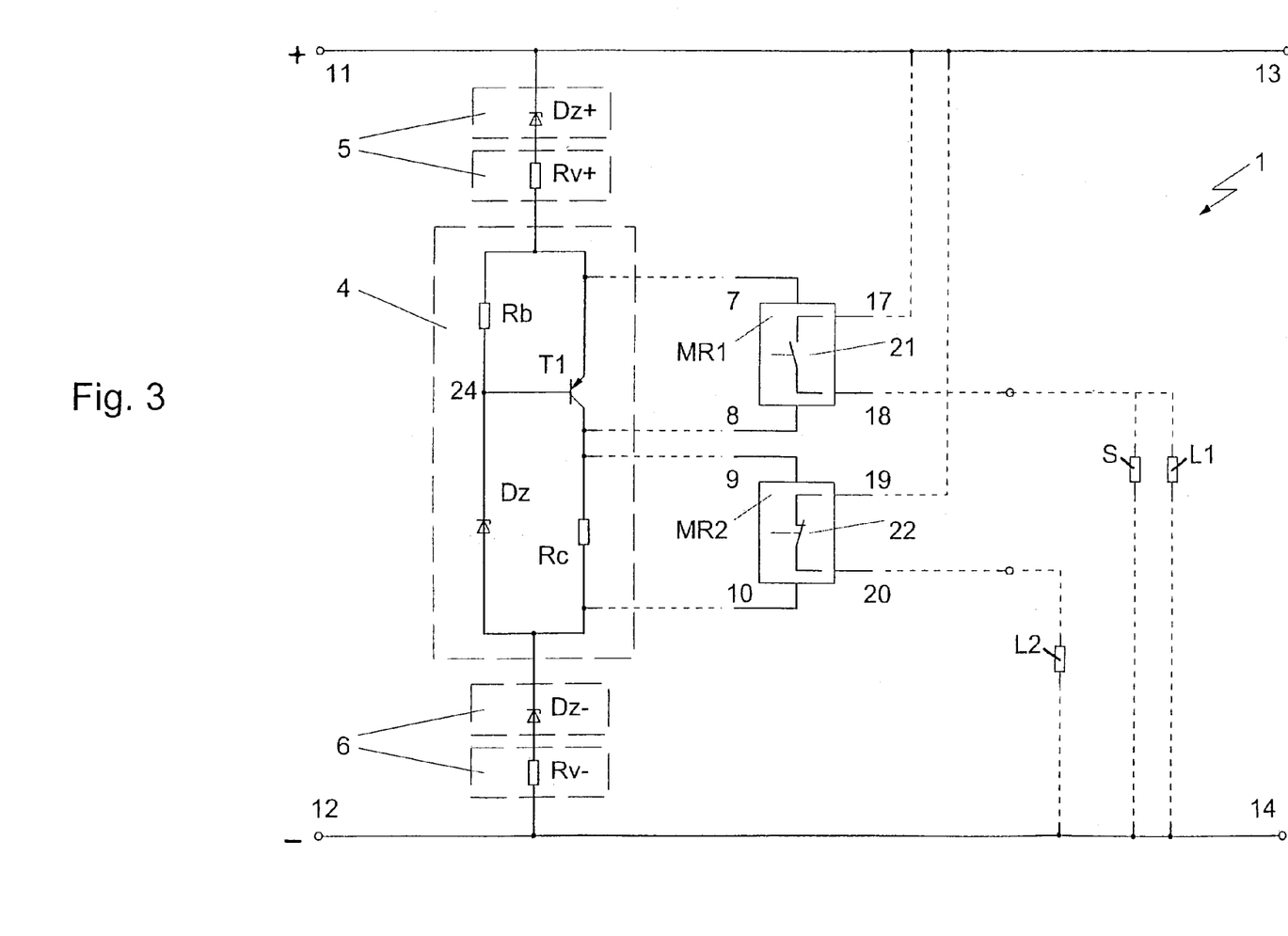
FIG. 3 The operating principle of the protective circuit according to the invention with core cells in two embodiments and extension cells, by means of which the different variants of the protective circuit can be derived by the as desired use of the elements shown.

FIG. 3 diagrammatically shows several variants of the protective circuit according to the invention. The protective circuit 1 has a core cell 4 with a pnp transistor Tl and two extension cells 5, 6 with Zener diodes Dz+ and Dz− and resistors Rv+ and Rv−. The core cell 4 is connected across the extension cells 5, 6 to a positive or negative supply voltage 11 or 12.

As the rapid switch, a microrelay MR1 is provided as the normally closed contact in a first advantageous variant of the protective circuit 1. Said microrelay MR1 has its input 7 at the emitter of the transistor Tl and its other input 8 at the collector of transistor Tl. The switchable output 17 is at the input terminal 11 of the protective circuit 1, whereas the other output 18 of the microrelay MR1 leads to the device L1, S to be protected. The device to be protected in the first variant of FIG. 3 is shown in exemplified form as a load L1 with voltage and current limiting device as a fuse mechanism S. Both the load L1 and the fuse mechanism S have their in each case other terminal at the protective circuit terminal 14.

The fuse mechanism S shown diagrammatically in FIG. 3 can be a Zener barrier with a fuse in the serial branch to the load L1, as is shown in the following FIG. 10.

In the standard case the two diodes Dz+, Dz− and one of the two resistors Rv+, Rv− are replaced by bridges, so that the first terminal of the core cell 4 is connected directly or across Rv+ to 11, 13. The other terminal of the core cell 4 then leads either directly or across Rv− to the line 12, 14.

In operation in the previously described circuit according to FIG. 3, the device to be protected in the case of an overvoltage is disconnected with such a brief time lag by the microrelay MR1 that in the short disconnection phase the power still transferred to the device to be protected is not sufficient to damage elements of said device S, L1 to be protected.

In normal operation the transistor Tl is nonconductive or blocked and the switch 21 of microrelay MR1 is closed. The supply voltage or the voltage for the device to be protected is applied to the input terminals 11, 12, because the switch 21 of microrelay MR1 is closed.

Thus, if a voltage peak reached the input terminals 11, 12, as a function of the voltage of the Zener diode Dz the latter would become conductive and as a result of the current flow in the nodal point 24 would bring about the switching through of transistor Tl.

Thus, as a result of the voltage switched off at terminals 7 and 8 of microrelay MR1, the switch 21 would open, so that there would be a rapid disconnection of the device S, L1 to be protected in the case of an overvoltage. Thus, in this way the device to be protected is protected against an overvoltage and the response of a fuse can be prevented by the rapid opening of the microrelay MR1.

FIG. 3 further shows the extension of the basic circuit comprising the core cell 4 and microrelays MR1, MR2 by extension cells 5, 6. In the case of FIG. 3, the extension cell 5 comprises a further Zener diode Dz and a series resistor Rv in series therewith. They can be provided individually or in combination as extension cells, e.g. serially to the core cell 4 with respect to the positive input terminal 11 and/or as an extension cell 6 with respect to the other input terminal 12.

As a result of such an extension cell 5 or 6 it is possible to limit the current flowing through the core cell 4. However, so-to-speak an adjustment of the starting voltage of the core cell 4 can therewith also be brought about. The core cell 4 can also have a Zener diode 26, which takes over the function of an input overvoltage protection for the microrelay MR1 (cf. FIG. 7).

In the further variant of the protective circuit 1 shown in FIG. 3 abstractly the microrelay MR2 is provided as a normally closed contact. The rapid disconnection function in the case of an overvoltage is implemented by the microrelay MR2. Said microrelay MR2 has its input terminals 9, 10 parallel to the collector resistor Rc of the previously described core cell 4. In the present case the microrelay MR2 is constructed as a normally closed contact with a switch 22, which is closed in normal operation, because a sufficient control voltage is not available across resistor Rc.

The output terminal 19 of microrelay MR2 is at the input terminal 11 of the supply voltage and its further output terminal 20 is at the device L2 to be protected, which is at the terminal 12 of the protective circuit 1.

If an overvoltage reaches the input terminals 11, 12, once again and as hereinbefore, the Zener diode Dz becomes conductive as a function of the voltage applied and due to the current flow in the nodal point 24 brings about the switching through of transistor Tl. As a result of this in the collector-emitter circuit of Tl would flow a current causing a voltage drop at Rc. This voltage drop at the collector resistor Rc, which is at the terminals 9, 10 of the microrelay MR2, brings about an opening of switch 22 and therefore a separation of the device L2 to be protected.

Due to the extremely short response time or pull-in time lag, the high input resistance, the low power consumption, the high switching frequency and the galvanic separation of the control and load circuits, such a microrelay MR1 or MR2 is eminently suitable as a fuse switch, particularly for overvoltages, especially since a galvanic separation is present at the terminals to the load after opening the switch.

The response value for an overvoltage to be detected is established by the Zener diode. However, if the microrelay response voltage is above the input voltage available at 11, 12, the microrelay cannot be controlled without additional measures.

Thus, for achieving very low response levels, it can be appropriate to connect upstream of the microrelay MR1 of MR2 a voltage transformer, which transforms the low level to a corresponding starting voltage level. The voltage transformer can ideally be constructed as an internal charge pump in the microrelay.

As is shown by the variants of the embodiment according to FIG. 3, as a function of whether the microrelay is constructed as a normally closed or normally open contact, solely by an appropriate insertion of the microrelay in the protective circuit 1 a separation can be achieved. As a result of the high input resistance account need not be taken of the microrelay as an operating resistor and instead it can be added as a switching element at virtually any suitable location substantially parallel to the existing components of the core cell 4.

As the core cell 4 according to FIG. 3 can be varied in different ways together with the extension cells 5, 6, in the following FIGS. 4 to 8 are shown embodiments together with the corresponding connection position of the microrelay MR1 or MR2.

Figure 4:
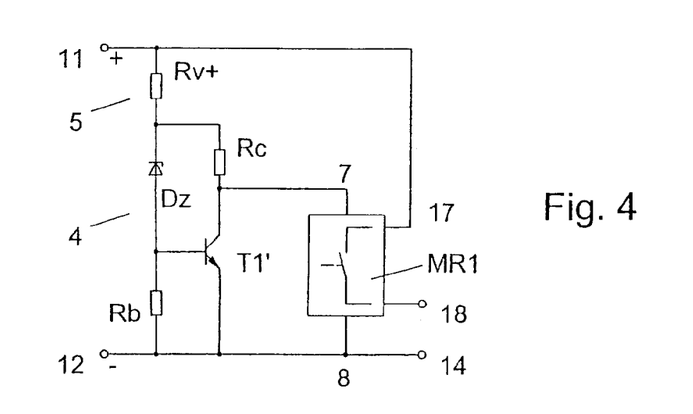
FIG. 4 An embodiment of the circuit with a core cell with npn transistor and a microrelay MR1 as the normally open contact at the output.

In FIG. 4 the core cell 4 comprises Zener diode Dz in series with the base resistor Rb. In the parallel branch in FIG. 4 is provided a npn transistor Tl' and a collector resistor Rc. As the extension cell 5 a series resistor Rv is provided facing the input terminal 11.

The microrelay MR1, which in the example of FIG. 4 is a normally open contact, has its terminal 7 at the collector of transistor Tl' and its other terminal 8 at the input terminal 12 or at terminal 14, respectively. The output 17 of microrelay MR1 is at terminal 11. The other output 18 is provided for the terminal of a device L1 to be protected, optionally together with a fuse mechanism S, which with its other terminals would be located at output 14.

Normally the microrelay MR1 is closed, so that the corresponding supply voltage is at the terminals 18, 14 relative to the device to be protected. If an overvoltage reaches terminals 11, 12, then the transistor Tl' is switched through. The microrelay MR1 opens and consequently switches off in a very short time the corresponding device to be protected or the upstream fuse mechanism S1 (FIG. 1), respectively, so that damage to the load at terminals 18, 14 is avoided.

An embodiment is also conceivable, in which the device L1, S1 to be protected has its one terminal at terminal 11 and its other terminal is connected to the output 17 of microrelay MR1. Terminal 18 of microrelay MR1 would then be connected to line 12, 14.

Figure 5:
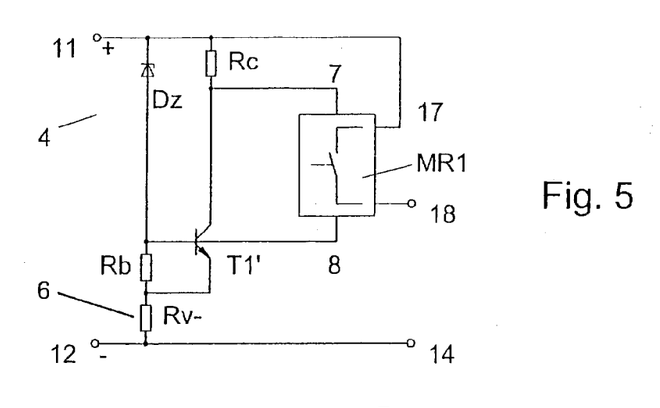
FIG. 5 A further derivation of FIG. 3 with a npn transistor, a control terminal of the microrelay being on the transistor base instead of the emitter as in FIG. 3.

Another advantageous embodiment is shown in FIG. 5. The core cell comprises Zener diode Dz and the series-connected base resistor Rb, which is followed by a series resistor Rv as the extension cell 6 facing the input terminal 12.

The second branch of the core cell 4 has a npn transistor Tl', whose collector is located across the collector resistor Rc at input 11. The emitter of the transistor Tl' is at the connecting point to the base resistor Rb and series resistor Rv. The base is at the nodal point between the Zener diode Dz and resistor Rb. The microrelay MR1 constructed as a normally open contact has its terminal 7 at the collector and its terminal 8 at the base of transistor Tl'. The output terminal 17 is at the input 11. The other output terminal 18 serves as a connection point for the device to be protected, whose further terminal is at output 14.

In a comparable manner the protection against an overvoltage comprises the microrelay MR1 opening when such an overvoltage occurs and as a result the following load is switched off.

Figure 6:
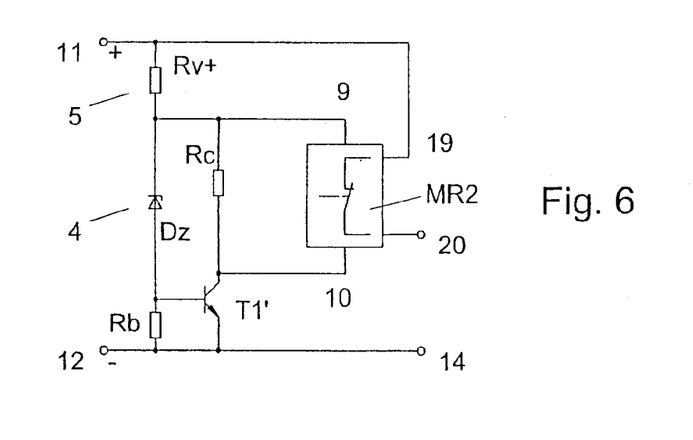
FIG. 6 Another embodiment of the protective circuit with a microrelay as the normally closed contact.

FIG. 6 shows the protective circuit with a microrelay MR2 as a normally closed contact. The core cell 4 comprises a Zener diode Dz and a base resistor Rb in one branch. A npn transistor Tl' with a collector resistor Rc is provided in the other branch. The core cell 4 is connected across a series resistor Rv to the input terminal 11. The base resistor Rb and the emitter of transistor Tl' are located at the input terminal 12 or the output 14, respectively.

The terminal 9 of microrelay MR2 is at the collector resistor Rc or series resistor Rv, respectively. The other terminal 10 is at the collector. The first output 19 of microrelay MR2 is at the input terminal 11. The second output 20 of microrelay MR2 serves as a connection point for a load, whose other terminal would be at output 14. If an overvoltage occurs at the input terminals 11, 12, a current flows across Zener diode Dz to the base of transistor Tl', which switches through, so that the potential at the collector resistor Rc reaches the terminals 9, 10 of microrelay MR2, which immediately opens and consequently separates and protects the load at the terminals 20, 14.

Figure 7:
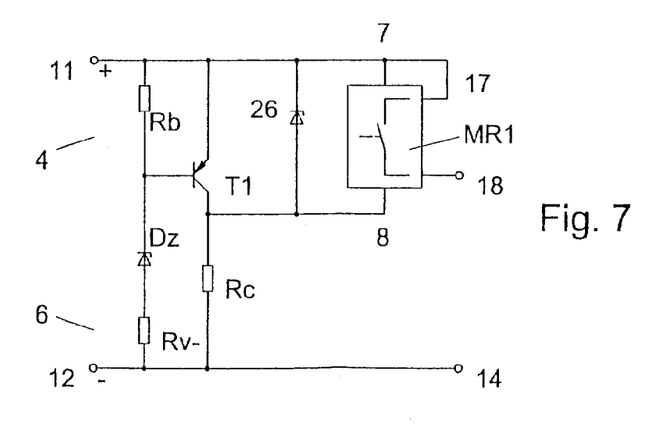
FIG. 7 Another variant of the core cell with pnp transistor and a Zener diode parallel to the microrelay MR1 for the inherent protection of the latter.

In the embodiment of FIG. 7 a further wiring possibility is shown for a microrelay MR1 as a normally open contact. The core cell 4 is slightly modified and in the left-hand, parallel branch a base resistor Rb is in series with a Zener diode Dz.

Connected downstream of the Zener diode Dz is provided a series resistor Rv in the sense of an extension cell 6 facing the input terminal 12 with negative potential. In the right-hand branch is provided a pnp transistor Tl with its emitter at the input terminal 11 and its collector across a collector resistor Rc at input 12 or output terminal 14, respectively.

The microrelay MR1 has one terminal 7 at input terminal 11 and its other terminal 8 at the collector of-the transistor Tl. The output 17 of microrelay MR1 is also at the supply voltage input terminal 11, whereas the other terminal 18 leads to a not shown load, whose other terminal would be located at the output terminal 14. For the inherent protection of the microrelay MR1 against an excessive control voltage, a Zener diode 26 is located parallel to the microrelay MR1 or to the emitter-collector path of the transistor Tl, respectively, with its anode at the collector or the terminal 8 of the microrelay MR1, respectively, and with its cathode at the input terminal 11. With said wiring on the one hand a connected load or a fuse mechanism, respectively is protected in the case of an overvoltage by the opening of the microrelay MR1. Simultaneously with a high voltage the microrelay MR1 would be protected by the Zener diode 26, because the latter in such a case would limit the control voltage.

Figure 8:
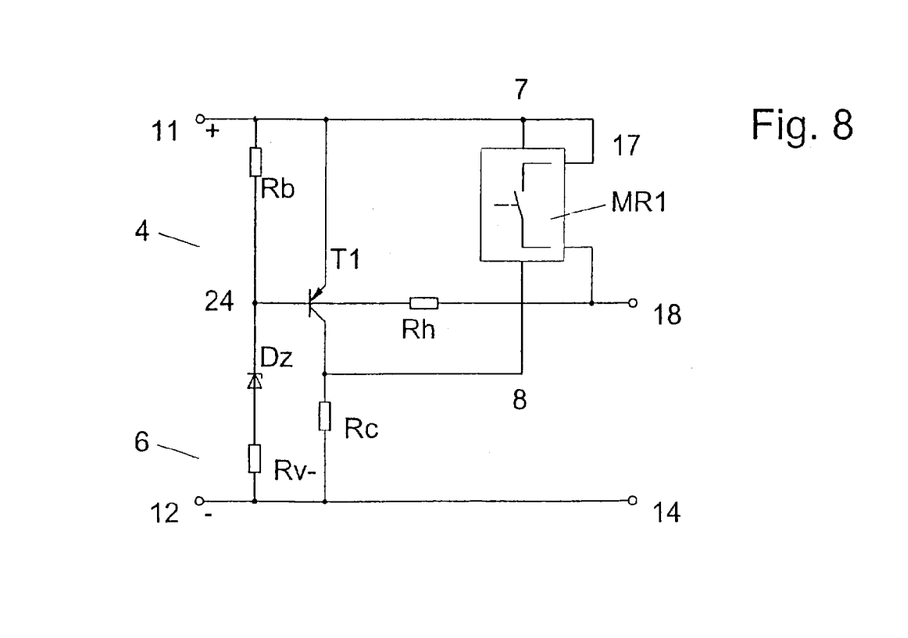
FIG. 8 Another embodiment of the protective circuit in which the output voltage is fed back across a resistor Rh as a hysteresis resistor to the core cell transistor base.

A circuit design with a feedback of the potential at the output 18 of microrelay MR1 to the base or nodal point 24 of the transistor Tl is shown in FIG. 8. The core cell 4 with extension cell 6 corresponds to the embodiment of FIG. 3. The output 18 of the microrelay MR1 constructed as a normally open contact is in the embodiment of FIG. 8 fed back across a hysteresis resistor Rh to the nodal point 24. By means of this feedback of the potential at output 18 and which is also supplied to the load, a stable disconnection of the microrelay MR1 extending to self-holding is obtained. However, the hysteresis function only exists in the case of a connected load with upstream-connected Zener barrier as the voltage and current limiting device.

Figure 9:
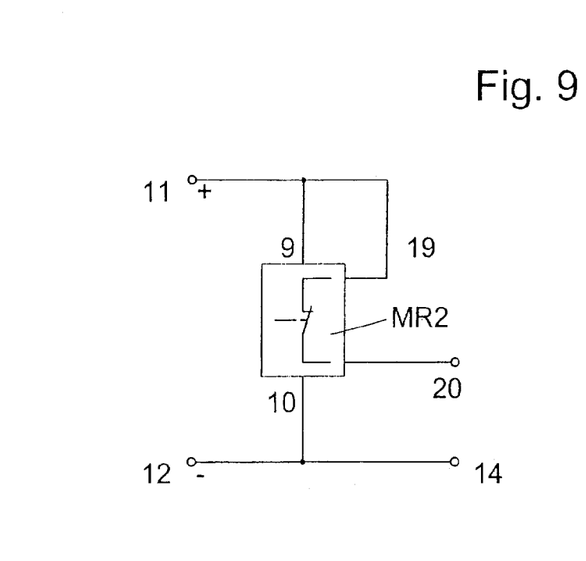
FIG. 9 The simplest embodiment of the protective circuit with a microrelay, as is possible with corresponding parameter adaptation.

As a result of the construction and switching behaviour of the microrelay the advantage arises that in the case of its design as a normally closed contact, as shown in FIG. 9, the microrelay MR2 can be used, without further component expenditure, as a protective circuit. However, the prerequisite is that the starting voltage or overvoltage occurring at terminals 9 and 10 against which the following load at terminals 20, 14 is to be protected corresponds to the starting voltage of microrelay MR2. In the embodiment according to FIG. 9 the terminal 9 and output terminal 19 of microrelay MR2 are at the input terminal 11. The output 10 is at the input terminal 12 or output terminal 14, respectively.

A load to be protected or a fuse mechanism S according to FIG. 3 would correspondingly be connected between the terminals 20, 14. If in the embodiment according to FIG. 9 an overvoltage reached the microrelay MR2, with an extremely short switching time via its switch the microrelay would separate the terminals 19, 20 and would correspondingly protect the following load against an overvoltage.

As a result of the construction of the microrelay based on semiconductor materials and also in integrated form, it is also possible to integrate the core cell 4 and extension cells 5, 6 in the manner of a semiconductor chip into the actual microrelay. In this way it is possible to provide the protective circuit in the form of a single component or chip in the corresponding circuit. According to the invention it is also possible to provide a quadripole module, in which the microrelay with its control inputs is connected either to the signal output, e.g. to the output signal of a switching stage, and the positive reference voltage or with the signal output and the negative reference voltage. Thus, without component expenditure, it is possible to select the action direction.

Figure 10:
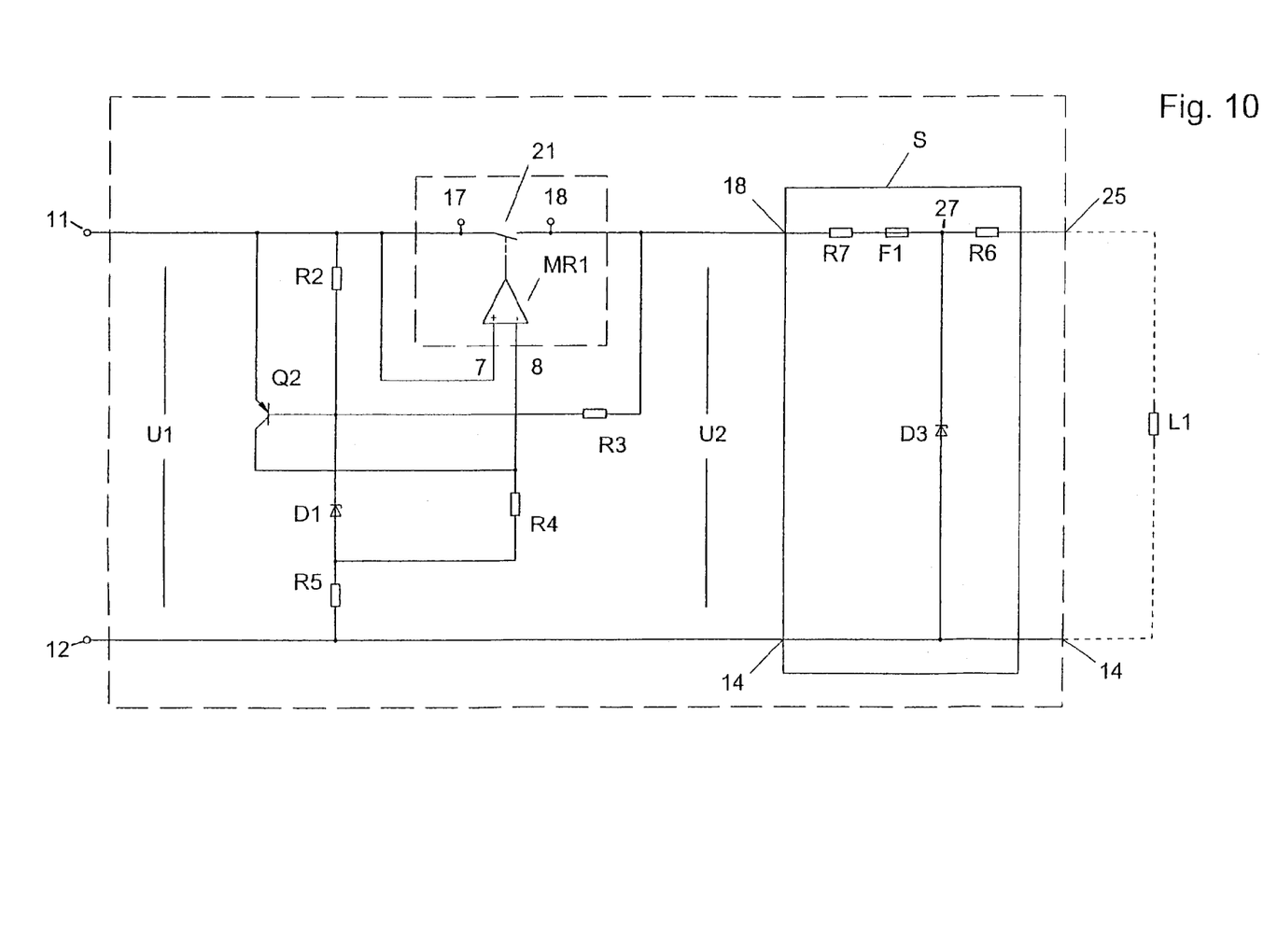
FIG. 10 A protective circuit with microrelay with downstream-connected voltage-current limiting device and following load.

FIG. 10 shows in a more detailed form the structure of a protective circuit for protecting the non-replaceable fuse F1 of the stylized Z barrier, as described hereinbefore with the aid of a core cell and extension cells in the wiring with a microrelay. The structure with a following fuse mechanism S, which is represented as a Zener barrier, and the following load L1 essentially corresponds to the applicant's earlier-dated application WO 00/62394, but in which conventional switching elements are used.

The protective circuit between the terminals 11, 12 and 18, 14 shown in FIG. 10 essentially corresponds to the embodiment according to FIG. 8. Between the input terminal 11 and input terminal 12 is provided in series a resistor R2, downstream of which is connected a Zener diode D1, as well as a further resistor R5. The emitter of a bipolar transistor Q2 is at the input 11 and its collector is located across a resistor R4 and a resistor R5 at the input terminal 12.

The base of transistor Q2 is placed across a feedback resistor R3 at terminal 18. The base is simultaneously at the potential between the resistor R2 and the cathode of the Zener diode D1.

The device to be protected here comprises the load L1 and/or an upstream fuse mechanism S constructed as a Z barrier. For the protection of the load L1 and Z barrier S a microrelay MR1 is provided between the terminals 11, 18 of switch 21. The input terminal 7 of microrelay MR1 is located at input 11, whilst its other input 8 is at the collector of transistor Q2 and resistor R4. Normally and with the standard supply voltage applied, the switch 21 of microrelay MR1 is closed, so that said voltage is supplied to the following fuse mechanism S.

The fuse mechanism S constructed as a Zener barrier is only diagrammatically shown in FIG. 10. In particular, the circuit shown is not intended to constitute an approvable Zener barrier. In the present case the fuse mechanism S has in the serial path between the terminal points 18, 25 a resistor R7 with a following fuse F1, which is designed as a blow-out fuse, together with a further resistor R6. At the nodal point 27 between fuse F1 and resistor R6 is located the cathode of a Zener diode D3, whose anode is at terminal 12 or 14. For safety reasons it is also possible to interconnect in a Zener barrier a plurality of Zener diodes.

The fuse mechanism S with the input terminals 18 and 14 and the output terminals 25 and 14 has in the embodiment according to FIG. 10 the function of protecting the load L1 at terminals 25, 14 on the one hand against an overvoltage and on the other against an excessive current flow.

The Zener diode D3 between terminals 27 and 14 is designed in such a way that if an overvoltage occurs the terminal points 27, 14 are limited to the Zener voltage. If an excessive current flow occurs between points 18 and 25, there would be a disconnection or interruption through the fuse F1 in the form of a blow-out fuse.

As the blow-out fuse F1 of the Zener barrier, particularly if the latter is in the explosion-proof sector, must not be changed, but instead following the response of F1 the entire Zener barrier would require replacement, a response of F1 should be avoided. To this end in the embodiment according to FIG. 10 an upstream-connected protective circuit is provided on the basis of the preceding arrangements according to FIGS. 1 to 9. The function of said upstream protective circuit, particularly in the case of an overload, but also with an excessive current due to an overload, is to permit a faster disconnection of the voltage applied, so that there is no need for the following fuse mechanism S to respond and consequently its components can remain without being impaired and consequently remain in place for further safety.

The protective circuit according to FIG. 10 between the terminal points 11, 12 and 18, 14 consequently performs the following function with an overvoltage. In normal operation the switch 21 of microrelay MR1 between points 17, 18 is closed. The transistor Q2 is blocked, so that a control voltage is applied to terminals 7, 8 of microrelay MR1 and switch 21 is closed.

If an overvoltage now reaches the terminals 11, 12, there is a current flow across the Zener diode D1 and the resistors R5, R2 in series therewith. Thus, there is a voltage potential at the base of transistor Q2, which turns on the latter. The drive voltage at terminals 7, 8 of microrelay MR1 is switched off, so that switch 21 is opened and consequently the disconnection of the following fuse mechanism S and load L1 is brought about. In addition, the circuit also limits the voltage applied to the input terminals 7, 8 of microrelay MR1, so that the latter is protected against an overvoltage.

The upstream-connected protective circuit with microrelays consequently allows in an advantageous manner the protection of the following load, the fuse mechanism S and the load L1 against overvoltages and excessive currents. In addition, disconnection is improved by galvanic separation and the design possibilities for the upstream protective circuit, as shown in FIGS. 1 to 9, are significantly extended.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. Protective circuit for limiting a voltage for a device to be protected, comprising:
    an input terminal and an output terminal, a common line and a voltage detector connected between the input terminal and the common line, said device to be protected being located in an output circuit of the protective circuit and being separable by means of a controllable switching device provided in serial arrangement between the input terminal and the output terminal, said voltage detector being in operative connection with the controllable switching device;
    said switching device being a micromechanical component having a control circuit with a high input resistance and an output circuit galvanically separated from the control circuit and switchable via said control circuit, said output circuit in the opened switching state having a galvanic separation of its output terminals;
    the voltage detector being provided in the form of a core cell which includes a transistor as an electronic switch, a diode as a voltage sensor, an operating resistor and at least one further resistor;
    the first terminal of the operating resistor being connected to a terminal of the transistor selected from the group of terminals consisting of collector and drain, whereby a first junction is formed;
    a first terminal of the diode and a first terminal of the at least one further resistor being connected to a terminal of the transistor selected from the group of terminals consisting of gate and base, whereby a second junction is formed;
    a second terminal of the diode being connected such that the diode and the at least one further resistor form a voltage divider for at least a part of an input voltage present between the input terminal and the common line, the second terminal of the diode forming a third junction;
    a second terminal of the at least one further resistor being connected to a terminal of the transistor selected from the group of terminals consisting of source and emitter, whereby a fourth junction is formed; and
    the control circuit of the controllable switching device being connected between the first junction and a junction selected from the group consisting of the second, third and fourth junctions.

2. Protective circuit according to claim 1, wherein the voltage sensor is a Zener diode.

3. Protective circuit according to claim 1, wherein the control circuit of the micromechanical component is arranged in parallel to the collector-emitter path of the transistor.

4. Protective circuit according to one of the claim 1, wherein the control circuit of the micromechanical component is arranged in parallel to a source-drain path of the transistor.

5. Protective circuit according to claim 1, wherein the control circuit of the micromechanical component is parallel to the operating resistor.

6. Protective circuit according to claim 1, wherein the control circuit of the micromechanical component is connected to a terminal of the transistor selected from the group of terminals consisting of base, gate, collector and drain.

7. Protective circuit according to claim 1, wherein there is a first adjusting device between the core cell and a positive terminal for a supply voltage and a second adjusting device between the core cell and a negative terminal for the supply voltage.

8. Protective circuit according to claim 1, wherein the first adjusting device has at least one series resistor.

9. Protective circuit according to claim 1, wherein the first adjusting service has at least a series connection including a series resistor and a Zener diode.

10. Protective circuit according to claim 1, wherein the micromechanical component is constructed as a microrelay with a normally open contact function.

11. Protective circuit according to claim 10, wherein the control circuit of the microrelay constructed as a normally open contact is at the emitter-collector path of the transistor.

12. Protective circuit according to claim 11, wherein the microrelay with an output terminal is directly or indirectly present at a positive or a negative supply voltage terminal and with another terminal directly or indirectly at the device to be protected.

13. Protective circuit according to claim 10, wherein the microrelay with an output terminal is present at a supply voltage terminal and with another terminal at the device to be protected.

14. Protective circuit according to claim 10, wherein the microrelay detects the voltage at its input terminals and if an overvoltage occurs the microrelay abruptly changes its switching state.

15. Protective circuit according to claim 10, wherein electrical components are connected upstream or in parallel with the microrelay for voltage and current limiting or the electrical components are integrated in the microrelay.

16. Protective circuit according to claim 10, wherein the voltage sensor is designed as a sensor selected from the group of sensors consisting of power sensors and temperature sensors.

17. Protective circuit according to claim 1, wherein the micromechanical component is constructed as a microrelay with a normally closed contact function.

18. Protective circuit according to claim 1, wherein the device to be protected is a load with an upstream-connected voltage and current limiting device.

19. Protective circuit according to claim 18, wherein the voltage and current limiting device connected upstream of the load is a Zener barrier.

20. Protective circuit for limiting a voltage for a device to be protected, comprising:

an input terminal and an output terminal, a common line and a voltage detector connected between the input terminal and the common line;

said device to be protected being located in an output circuit of the protective circuit and being separable by means of a controllable switching device provided in serial arrangement between the input terminal and the output terminal and in which the voltage detector is in operative connection with the controllable switching device;

the switching device being a micromechanical component, which has a control circuit with a high input resistance and an output circuit galvanically separated from the control circuit and switchable via said control circuit, the output circuit in the opened switching state having a galvanic separation of its output terminals;

the voltage detector being provided in the form of a core cell which includes a transistor as an electronic switch, a diode as a voltage sensor, an operating resistor and at least one further resistor;

the first terminal of the operating resistor being connected to a terminal of the transistor selected from the group of terminals consisting of collector and drain, whereby a first junction is formed;

a first terminal of the diode and a first terminal of the at least one further resistor being connected to a terminal of the transistor selected from the group of terminals consisting of gate and base, whereby a second junction is formed;

a second terminal of the diode being connected such that the diode and the at least one further resistor form a voltage divider for at least a part of an input voltage present between the input terminal and the common line, the second terminal of the diode forming a third junction;

a second terminal of the at least one further resistor being connected to a terminal of the transistor selected from the group of terminals consisting of source and emitter, whereby a fourth junction is formed;

a control circuit of the controllable switching device being connected between the first junction and a junction selected from the group consisting of the second, third and fourth junction; and the device to be protected being a load with an upstream connected Zener barrier as a voltage and current limiting device.

* * * * *